Dec. 18, 1923.
E. W. IWEN
CHEESE BOX
Filed Dec. 5, 1921
1,478,181
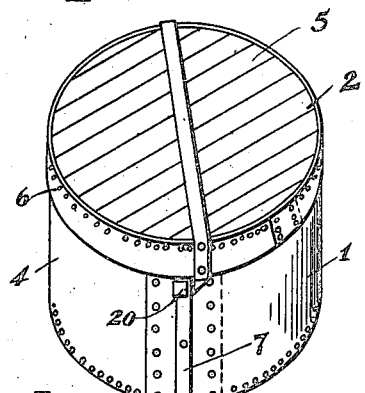
FIG. 1.
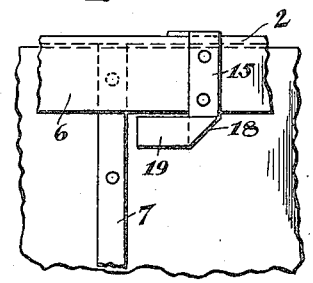
FIG. 2.
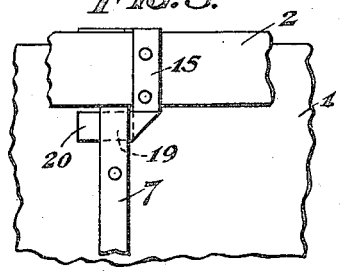
FIG. 3.
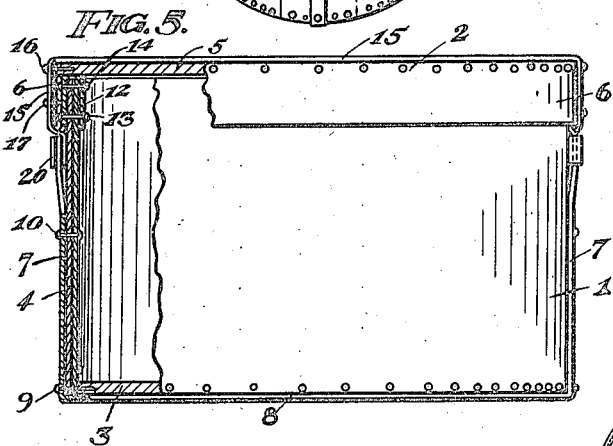
FIG. 5.
FIG. 4.
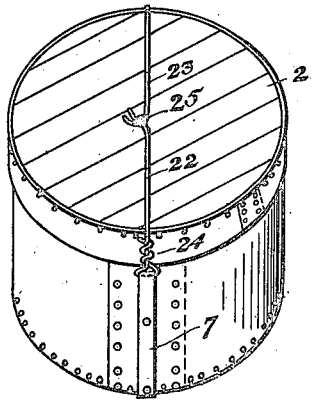
FIG. 6.
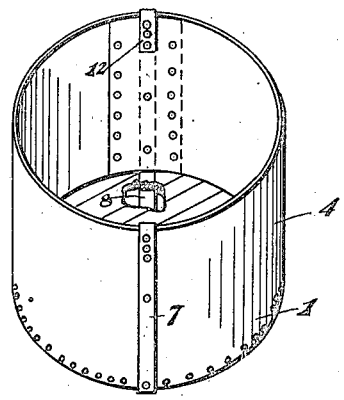
INVENTOR
Edwin W. Iwen
BY
Erwin Wheeler & Woolard
ATTORNEYS.

Patented Dec. 18, 1923.

1,478,181

UNITED STATES PATENT OFFICE.

EDWIN W. IWEN, OF SHAWANO, WISCONSIN.

CHEESE BOX.

Application filed December 5, 1921. Serial No. 519,814.

*To all whom it may concern:*

Be it known that I, EDWIN W. IWEN, a citizen of the United States, residing at Shawano, county of Shawano, and State of Wisconsin, have invented new and useful Improvements in Cheese Boxes, of which the following is a specification.

This invention relates to improvements in cheese boxes, with particular reference to reinforcing and securing means for the covers of such boxes.

It is an object of this invention to provide novel and cheaply constructed means for securing to cheese boxes the covers thereof, whereby the box and cover, when secured, will comprise a more rigid structure than it has been possible to attain in the use of securing devices hitherto employed.

It is a further object of this invention to provide a cheese box with means for securing the cover thereto, in which the cover itself will co-operate with the securing device to prevent the accidental disengagement of said device from the box.

It is a further object of this invention to provide a cheese box with means for securing the cover thereto; which may be operated in a minimum of time; and which may be used repeatedly if the occasion arises.

In the drawings:—

Figure 1 is a perspective view of a cheese box, showing one embodiment of this invention.

Figure 2 is a detail, on a larger scale, showing the securing means before it has been operated to secure the cover to the box.

Figure 3 is a view similar to Figure 2, showing the first step in the operation of securing the cover to the box.

Figure 4 is a perspective view of the box with the cover removed, showing details of the application of the securing device to the box.

Figure 5 is an elevation, on an enlarged scale, of a cheese box equipped with a device embodying this invention, portions of the box being broken away to expose, in partial section, the cover retaining device.

Figure 6 is a view similar to Figure 1, showing, in modified form, a cover retaining device embodying this invention.

Like parts are identified by the same reference characters thruout the several views.

The reinforcing and securing device, embodying this invention, may be applied to a box 1 and cover 2 of ordinary construction. It will be understood that the ordinary cheese box is made up of a circular base portion 3 about which is bent one or more strips of thin wood to form the side walls 4. The box is ordinarily assembled by nailing. The cover consists of a circular piece of wood 5 similar to the base 3, but larger in diameter. A strip of wood 6, nailed circumferentially about the cover, provides a flange adapted to be engaged over the side walls 4 of the box 1.

That portion of the cover securing device which is attached to the box proper consists of a strip 7 of tin, or other thin metal, nailed or riveted to the side of the box in the manner clearly shown in Figure 1 and preferably passed entirely across the bottom of the box, as shown at 8 in Figure 5. It is not material to this invention, however, whether the portion 8 of the strips 7 be included or not, since these strips can be secured adequately to the box if they extend merely to and not across its bottom. The securing means for the strip 7 preferably include at least one nail 9 so driven thru the side wall 4 of the box as to penetrate and engage its base portion 3. Such a nail will provide a secure anchorage for the lower end of strip 9, whether said strip is extended as at 8 across the bottom of the box or not. A second nail or rivet 10 is preferably provided to pass thru the strip 7 and the side wall 4 of the box, approximately midway between the bottom and top of the wall. It will be particularly noted from Figure 5, that at the top of the box, the strip 7 passes over the rim portion of the side wall 4 and is extended for approximately the width of the cover flange 6 down the inner side of said wall. That portion of the strip 7 which appears within the box will be hereafter designated by the numeral 12. The reason for extending portion 12 of strip 7 the specified distance down the inner wall 4 of the box is that a single rivet 13 may be employed to secure the portion 12 and the corresponding portion of the strip 7 to the wall of the box at this particular point, it being desired for reasons which will hereinafter appear to bind the strip 7 to the box adjacent the lower margin of the cover flange 6. For further security, the rivet 14 may also be engaged with the strip 7 and its inwardly disposed end portion 12.

Upon the cover of the box, the strip 15 of light metal corresponds to the strip 7 used upon the box proper. The strip 15 is preferably extended completely across the cover of the box in the manner shown in the drawings. It is secured to the cover upon each side of the disk-like wooden member 5 by a nail 16 passed thru the tin strip 15 and the cover flange 6 into anchorage in the wooden disk 5. The rivet 17 may be used to further secure the metal strip 15 to an intermediate portion of the cover flange 6. The arrangement is preferably such that the securing means employed (the rivet 17) will not register with the rivet, or other securing means, indicated at 13 and 14 upon the box proper.

That portion of the metal strip 15, carried by the cover, which extends below the lower margin of the cover flange 6 is bent upon itself at right angles by the formation of a diagonal crease 18 to produce the laterally projecting member 19. This member is adapted to be passed behind strip 7 in the manner illustrated in Figure 3 by rotating the cover of the box relative to the box proper. After the laterally projecting member 19 has been thus engaged behind the strip 7, it may be locked thereto to prevent the possibility of an accidental disengagement of the cover 2 by folding the extreme end 20 of the member 19 back upon itself outside of strip 7 in the manner clearly shown in Figures 1 and 5.

The function of the rivet 13 must now be obvious. It is so disposed as to bind strip 7 to the side of the box directly above the point of engagement of the lateral member 19 with said strip. Member 19 is thereby limited against any possible upward movement between said strip and the wall of the box and means are thereby provided for securing the cover in such a manner that it cannot, to any extent, yield upwardly.

In the modification disclosed in Figure 6, the two wire members 22 and 23 pass over the cover 2 of the box in binding relation thereto, in place of the strip 15 employed for this purpose in the embodiment previously discussed. Staples cannot be used to secure the wire to the cover and the wire may, therefore, be left unattached and may depend for positioning means upon the strips 7 which are identical with the corresponding strips shown in the other drawings. The wires 22 and 23 may be passed behind strips 7, between said strips, and the side wall of the box and the end of each wire may then be lopped and twisted, as at 24, to secure the wires to said strips. It will be noted that the rivet, or other securing device 13, will function as before in maintaining the cover securing means in its proper position relative to the margin of said cover. The wires 22 and 23, having thus been secured at their outer ends beneath the strips 7, are passed inwardly over cover 2 and twisted together as at 25 to secure the cover rigidly in place.

Attention is called to the fact that the rivet 13 is aided in its previously discussed function of positioning the ends of the cover securing means by the cover flange itself which bears against the head of the rivet in the manner clearly shown in Figure 5 and resists any tendency for the strain upon the cover retaining means to draw the rivet. The construction illustrated has been found capable of withstanding heavy strains, and it is believed that the location of the rivet 13 within the cover flange 6 and immediately above the point of engagement of the cover securing means with the strip 7 is largely responsible for the strength and rigidity of the structure.

The operation of this device may be summarized as follows:—

The box to which a cover is to be secured is provided with the strips 7 disposed vertically upon its sides and connected, if desired, across the bottom of the box by the strip 8. Any suitable anchoring means may be used for the strip 7, but the nail 9 which enters the bottom disk 3 of the box is preferably employed and it is important that the rivet 13 be disposed in the manner previously indicated. Cover securing means are now provided. These means may consist of wires engaged with the strip 7 beneath the rivets 13, or they may consist of the metallic strips 15 permanently secured to the cover of the box. Where the strips 15 are used, they are bent at right angles to form the lateral projections 19 shown in Figure 2. The cover 2 is then placed upon the box 1 with the laterally projecting portion 19, or strip 15, in the relation to the strip 7 indicated in Figure 2. The cover 2 is then rotated relative to the box sufficiently to pass members 19 behind strips 7. The ends 20 of members 19 may now be folded to engage strips 7, thereby securing the cover of the box against displacement in any direction.

By referring to the specified objects of this invention, it will be seen that the construction herein disclosed satisfies all of said objects and makes possible the cheap construction of a cheese box and securing means therefor, which will result in a rigid and reinforced structure when used. While this invention is adapted for use in the manufacture of any boxes, and particularly of any round boxes, it is especially valuable in connection with the manufacture of containers for cheese where a cheap and effective fastening, susceptible of ready manipulation, is needed.

I claim:—

1. The combination with a wooden container having a bottom and a side wall, of a metallic strip anchored to the bottom and to said wall adjacent the upper margin thereof, a cover for said container, and a cover retaining device engageable with said strip, said device being adapted to permit ready removal and subsequent replacement of said cover.

2. The combination with a container provided with a removable cover, of a strip of material extending around the bottom of the container and secured to said container adjacent its margin at two substantially opposite points, and a cover retaining device extending over the cover and detachably engaged upon opposite sides of the container with said strip.

3. The combination with a box provided with a wooden bottom and the cover thereof, of metallic strips at the sides of the box, nails securing said strips to the bottom of the box, means for securing said strips to said box at a predetermined distance from its top, and cover securing means engaged behind said strips and beneath said securing means.

4. The combination with a box and a flanged cover therefor, of a set of strips disposed on the sides of the box, a rivet securing said strips to the box within the flange of the cover and adjacent the lower margin of said flange, and cover binding means engaged with said strips beneath said rivets.

5. The combination with a box and its cover, of strips secured to the sides of said box, similar strips secured to the cover, and provided with end portions bent at right angles to permit laterally projecting members, said end portions being engaged behind the strips on the box proper, whereby said cover may be secured against removal.

6. The combination with a round box and a flanged cover therefor, of strips secured at intervals to the sides of said box, and laterally projecting members carried by the cover, said members being engageable behind said strips by a partial rotation of said cover relative to the box.

7. The combination with a round box and a flanged cover therefor, of strips secured to the sides of said box at intervals, similar strips carried by the flange of said cover and bent to form laterally projecting members engageable behind said first mentioned strips by a partial rotation of the cover relative to the box.

8. The combination with a round box and a flanged cover therefor, of strips disposed upon the side of the box, rivets binding the strips to the box, one of said rivets being disposed upon said strip within the area included by the flange of the cover, and a set of laterally projecting members carried by the cover and engaged behind said strips and immediately beneath said last mentioned rivets, said laterally projecting members being folded back upon themselves about said strips.

EDWIN W. IWEN.